United States Patent

[11] 3,632,144

| [72] | Inventors | Harold Shire<br>Los Angeles;<br>Ira R. Newman, Lakeview Terrace; Robert<br>S. Allison, San Gabriel, all of Calif. |
|---|---|---|
| [21] | Appl. No. | 886,492 |
| [22] | Filed | Dec. 19, 1969 |
| [45] | Patented | Jan. 4, 1972 |
| [73] | Assignee | General Connectors Corporation<br>Burbank, Calif. |

[54] CONNECTOR CLAMP
9 Claims, 9 Drawing Figs.

[52] U.S. Cl. .................................................. 285/231,
285/369, 285/367
[51] Int. Cl. ........................................................ F16l 21/00
[50] Field of Search............................................ 285/223,
231, 345, 365, 367, 369, 407, 410, 363

[56] References Cited
UNITED STATES PATENTS

| 1,848,198 | 3/1932 | Reid............................. | 285/231 |
| 2,085,922 | 7/1937 | Moore.......................... | 285/369 X |
| 2,187,119 | 1/1940 | Fish.............................. | 285/231 X |
| 2,499,476 | 3/1950 | Eyerly.......................... | 285/231 X |
| 2,526,754 | 10/1950 | Johnson et al. ............... | 285/231 X |
| 3,094,343 | 6/1963 | Wood........................... | 285/363 X |
| 3,164,401 | 1/1965 | Fawkes......................... | 285/369 X |

FOREIGN PATENTS

| 768,040 | 5/1934 | France ......................... | 285/345 |

*Primary Examiner*—Dennis L. Taylor
*Attorney*—Julius L. Rubinstein

ABSTRACT: The invention is a generally cylindrical split ring adapted to tightly embrace a thin-walled tube. The ends of the clamp have constricting means for decreasing the diameter of the split ring in order to cause it to tightly embrace a tube. The ring is provided with a plurality of channel-shaped claws designed to embrace the cylindrical ribs of a slip joint connector, whereby the thin-walled tube and slip joint connector are releasably held in longitudinally fixed relationship.

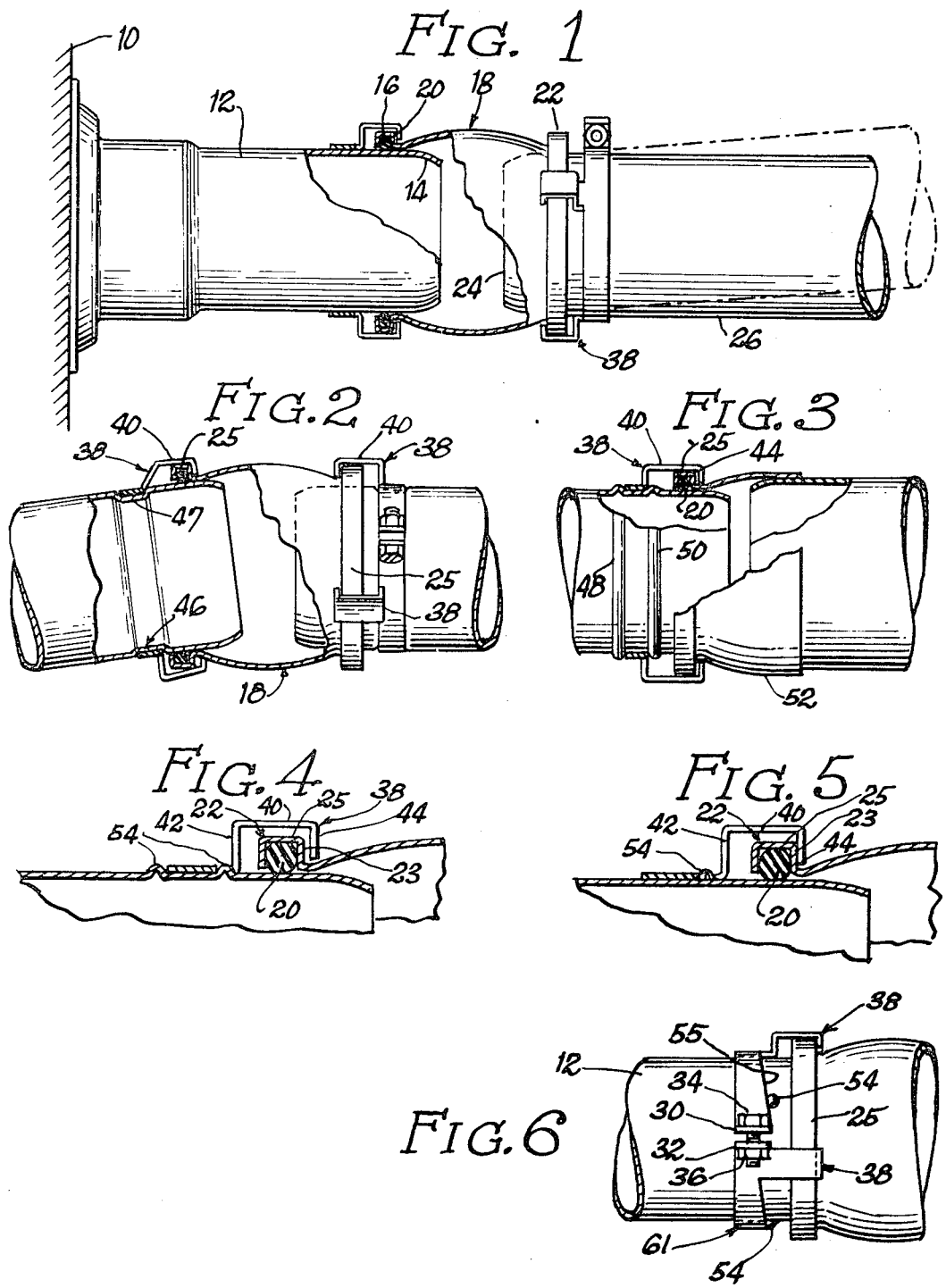

3,632,144

CONNECTOR CLAMP

BRIEF SUMMARY

Heretofore flexible sealed connectors comprised an annular coupling sleeve or slip joint connector, which had a generally radially projecting rib-shaped integrally formed seal ring receiving channel on at least one end. The central portion of the coupling sleeve structure extended radially outwardly from at least one end to provide a flexible fluidtight connection.

Thin-walled tubes penetrated the ends of the coupling sleeve structure, and in order to hold the thin-walled tubes and coupling sleeve structure in fixed relationship against tension, one end of a resilient arm was spot welded to the thin-walled tube. This arm terminated in an inverted claw which fit over the radially projecting rib-shaped channel formed on the end of the coupling sleeve structure.

However, these coupling sleeve connectors are often used in aircraft and the structure often must be disconnected from the thin-walled tube by maintenance personnel doing repair work on the airplane. The repeated disconnection of the coupling sleeve structure caused repeated flexing of the resilient arm, which resulted in failure of the spotweld connection. When this happened, some delay was caused by the necessity of finding another spot on the circumference of the thin wall of the tube, which had not been previously spotwelded, and then the arm had to be spotwelded to this portion of the wall of the tube again. Since the flexible arm always had to be spotwelded at substantially the same distance from the end of the tube, the resilient arm could only be reattached to the tube a limited number of times before the entire tube had to be replaced.

If the arm of the claw could be releasably held in fixed position on the thin-walled tube without spot welding, this problem would be eliminated. What is needed, therefore, and comprises an important object of this invention, is to provide a clamp with arms and claws integrally attached for releasably embracing a thin-walled tube.

These and other objects of this invention will become more apparent when understood in the light of the accompanying specification and drawings wherein, FIG. 1 discloses an elevational view of a coupling sleeve structure held in substantially linearly fixed relationship with thin-walled tubes by means of clamps constructed according to the principles of this invention.

FIG. 2 discloses an elevational view of a modification of the thin-walled tubes wherein the clamps constructed according to the principles of this invention are positioned in recesses formed in the thin-walled tubes.

FIG. 3 discloses an elevational view of a coupling sleeve structure constructed according to the principles of this invention with a clamp held in fixed position on a thin-walled tube by means of spaced outwardly projecting ribs formed on the periphery of the thin-walled tube, and wherein the coupling sleeve structure is provided with a seal-ring-receiving channel at only one end.

FIG. 4 discloses a sectional view of a portion of the clamp constructed according to the principles of this invention wherein the clamp is prevented from moving beyond a predetermined distance from the end of the thin-walled tube by means of a plurality pimplelike protuberances formed on the periphery of the tube.

FIG. 5 discloses a sectional view of a portion of the clamp constructed according to the principles of this invention wherein the clamp is prevented from moving beyond a predetermined distance nearer to the end portion of the thin-walled tube by means of pimplelike protuberances formed on the periphery of the thin-walled tube.

FIG. 6 is an elevational view of the clamp and thin-walled tube shown in FIG. 5.

Figure 8:
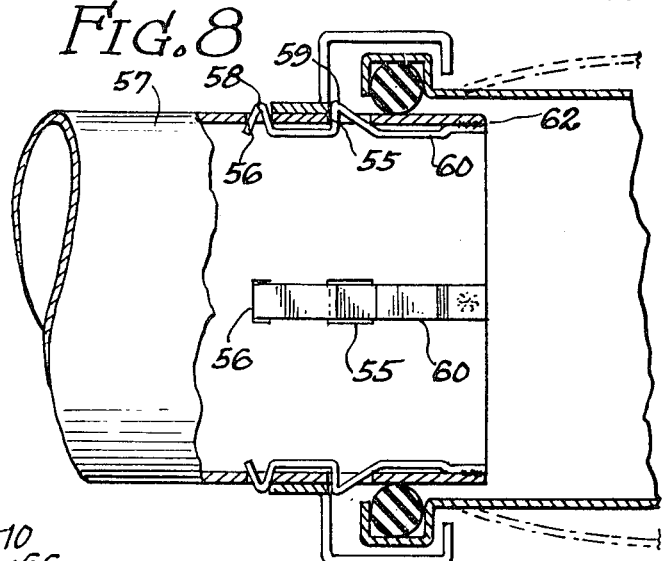

FIG. 8 discloses a portion of a sectional view of a modified form of a thin-walled tube with openings disposed around the periphery of the tube and with projections mounted on a resilient support extending through these openings.

Figure 9:
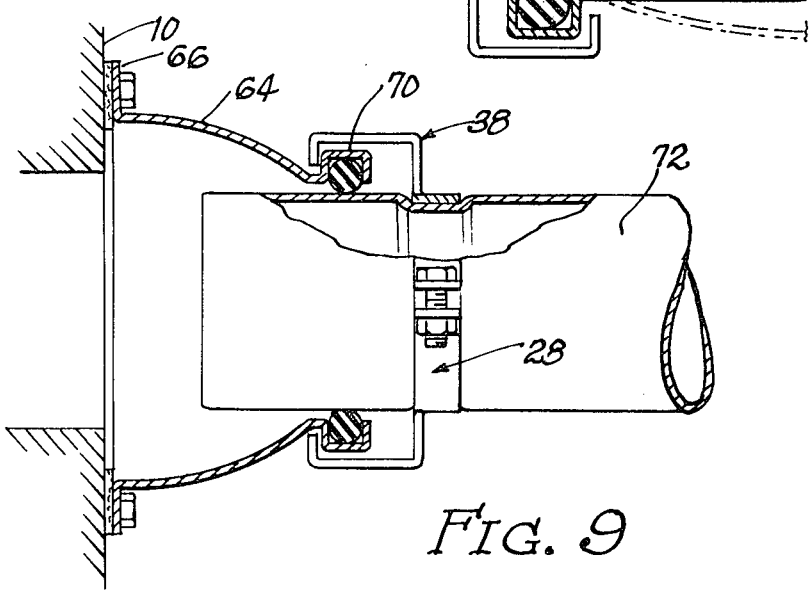

FIG. 9 discloses a modified coupling sleeve terminating in a radially outwardly projecting rib-shaped structure and with a thin-walled tube penetrating the coupling sleeve structure. A clamp constructed according to the principles of this invention embraces the thin-walled tube with claws bearing against the rib-shaped structure formed on the end of the coupling sleeve.

Referring now to FIG. 1 of the drawing, a bulk head indicated by the reference numeral 10 is provided with an attached thin-walled tube 12, which covers an opening in the bulkhead leading, for example, to air-conditioning supply ducts in an airplane. The free end 14 of the thin-walled tube penetrates end portion 16 of the coupling sleeve 18 with the periphery of the tube 12 in sealing and pivoting engagement with the seal 20, as shown in FIG. 1. Seals 20 are positioned inside of an internal outwardly projecting rib-shaped channel 22, formed at the end portion 16 and 17 of sleeve 18. Seal 20 is shaped so its sealing capacity increases with increasing internal tube pressure and/or temperature.

The end portion 24 of another thin-walled tube penetrates the end portion 17 of sleeve 18. As shown in dotted lines, the shape of the coupling sleeve 18 permits the thin-walled tubes 12 and 26 to flex substantially in relation to each other to accommodate vibration caused by operation of the airplane or other vehicle in which the connecting tubes and coupling sleeve are mounted. It is also apparent that if the seal rings are thick enough, some limited flexure would be permitted by the engagement between the seal rings and the surface of the thin-walled tubes.

Figure 7:
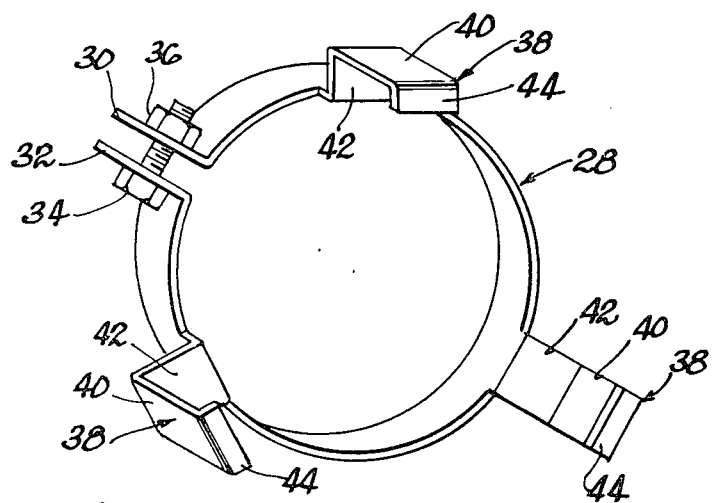
FIG. 7 is a perspective view of the clamp constructed according to the principles of this invention.

A generally cylindrical split clamp ring 28 embraces the end portions 14 and 24 of tubes 12 and 26, see FIGS. 1 and 7. The split ends 30 and 32 of clamp ring 28 are flanged radially outwardly. These ends are provided with aligned bolt-receiving holes through which a bolt 24 extends. A nut 36 is mounted on this bolt as shown. With this arrangement as nut 36 is tightened on the bolt 34, the diameter of the clamp ring 28 is decreased, so that the clamp ring may be tightened on the periphery of the tubes 12 and 26.

In the particular embodiment shown, the clamp ring 28 is provided with three integrally attached claws 38, disposed in equally spaced angular relation around the periphery of the clamp ring. In this particular embodiment, the claws are generally channel shaped in cross section and include a base or web portion 40 with transverse wall portions 42 and 44, at each end.

In assembled relation, as best seen in FIGS. 4 and 5, the claws 38 fit over the rib-shaped channels 22, and when tension exists between a thin-walled tube and the coupling sleeve, wall 44 of the claws bears against the wall 23 of the rib-shaped channel to limit and prevent separation between the coupling sleeve and the tube while permitting flexure between the thin-walled tube and the coupling sleeve. As shown in FIG. 2, this requires that the web 40 of the claw be wider than the web 25 of the rib.

It is contemplated that the coupling sleeve and the thin-walled tubes be used for the transmission of gasses at high temperatures, and in air-conditioning ducts in aircraft. To prevent leakage of these gasses, it is necessary that the end portion of the thin-walled tubes penetrate a sufficient distance inside the coupling sleeve. This, in turn, requires the clamp ring 28 to be positioned a predetermined distance from the end portion of the thin-walled tube when the claws 38 fit over the rib-shaped channels 22.

The clamp ring 28 can be positioned on the thin-walled tube by a painting or scribing marks on the surface of the tube. However, long-continued use plus the heat of the gasses passing through the tubes could destroy the marks, so that the clamps might not be properly positioned on the tube for adequate penetration of the end portions 14 or 24 inside the coupling sleeve 18.

To prevent this from happening, a recess 46 could be formed on the periphery of the end portion of the thin-walled tube. As shown in FIG. 2, the width of the base 47 of the recess is substantially equal to the width of the clamp ring 28, so that in assembled relation the clamp ring fits in the recess and would be tightened there. This arrangement is such that it is unlikely that the clamp ring would ever slide out of the recess, even if the bolt and nut 36 were not tightened sufficiently or become loosened due to vibration. This is because the edges of the clamping ring 28 bear against the sidewalls of the recess as shown in FIG. 2.

There is another advantage in using a recess formed in the ends of the thin-walled tube. The coupling sleeve 18 is provided with seal rings 20, which deteriorate in use, and periodically must be replaced. This can be done easily without disturbing or disassembling the thin-walled tubes penetrating the coupling sleeve. It only requires loosening and moving one of the split clamping rings 28 out of the recess 46 by either taking it off the tube or merely sliding it backwards on the surface of the tube. Then the coupling sleeve 18 can be slid over the recess 46 and along the surface of the thin-walled tube until its end portion moves off of one of the thin-walled tubes, exposing an opening in the coupling sleeve so that access to the interiorly mounted seal rings can be obtained for purposes of replacement.

Under some circumstances, spaced projecting annular externally projecting ribs 48 and 50 could be formed on the surface of the thin-walled tube at the required distance from the end portion, see FIG. 3. These ribs would be spaced apart a distance equal to the width of the split clamp ring 28, so the clamping ring 28 could fit between the ribs and be held in position when the bolt and nut 34 and 36 are tightened.

This arrangement also has the advantage that the ribs tend to strengthen the end portions of the tube. Furthermore, if the ends of the coupling sleeve are sufficiently resilient, the coupling sleeve might be moved over the ribs in order to replace the sealing rings 20 in the manner described above. In the embodiment shown in FIG. 3, the coupling sleeve 52 happens to be provided with the seal ring at only one end, while the opposite end of the coupling sleeve fits over a thin-walled tube. Under some circumstances, as when the gas pressure inside the tube is low, this arrangement is satisfactory, although it is understood that the principles of this invention could be practiced with coupling sleeves having seal rings at both ends.

In the example shown in FIG. 4, the clamp ring 28 is held in position between spaced pimplelike protuberances 54 formed on the periphery of the thin-walled tube with the clamp ring 28 tightened between these protuberances. As seen in assembled relation to these protuberances bear against the opposed edges of the clamp ring. It is apparent that these projections are disposed at the proper distance from the end portion of the tube to allow for adequate penetration of the end of the thin-walled tube inside the coupling sleeve.

In the arrangement disclosed in FIG. 4, the coupling sleeve 28 cannot move back over the thin-walled tube for maintenance purposes, as described in connection with the thin-walled tube shown in FIG. 2. Under some circumstances, this is not a disadvantage. However, if it should be necessary, the protuberances 54 could be treated so they are weakened sufficiently to flex and permit the coupling sleeve to be forced over them for maintenance purposes. At the same time, the protuberances could be strong enough to hold the clamping ring 28 in fixed position on the thin-walled tube.

Alternatively, existing stock of thin-walled tubes could be modified by drilling holes 56 around the periphery of the end of the thin-walled tube 57 at locations where the above-described protuberances 58 would be positioned. The protuberances 58 would be mounted on a resilient support 60, and the support 60 would be attached to the end portion 62 of the modified tube 57 by spot welding, or clamp rings or any other suitable means. The protuberances 58 would penetrate the openings or holes 56, and would serve as protuberances to hold the clamp ring 28 in proper position as described above.

The protuberances 58 would, of course, have to be shaped so that when the thin-walled tube is under pressure the protuberances would be forced into sealing engagement with the holes 56 to prevent leakage of gases. Alternatively, or simultaneously, the protuberances could be composed of a suitable material such that at elevated temperatures the protuberances would expand into sealing engagement with the holes 56 to prevent leakage of the gasses. In addition, the protuberances would also have to be shaped so their surface facing the coupling sleeve would serve as a cam so when the coupling sleeve is forced against them, the protuberances would be forced down into the opening 56 to permit the coupling sleeve to be passed over them.

With this arrangement, when maintenance work is required, the coupling sleeve could be forced over the resiliently mounted protuberances 58, which would be forced down through holes 56 to permit both the clamping ring and the coupling sleeve to be slid back on the thin-walled tube to provide enough room for maintenance purposes as described above. Successful operation of this structure would, of course, require that the resilience or springiness of support 60 be strong enough to maintain the clamp ring 28 between the protuberances in assembled relation, but weak enough so that the coupling sleeve could be forced over the protuberances as described above when maintenance work is necessary.

In the embodiment shown in FIGS. 5 and 6, the protuberances, either those integrally formed on the surface of the tube or those shown in FIG. 8, are disposed only at the edge 55 of the modified clamping ring 61 nearest the end portion of the tube. This edge is cut at a bias to serve as a cam. With this arrangement, adequate penetration of the thin-walled tube is assured. However, the modified clamping ring could move a short distance longitudinally if the clamping ring 61 is rotated before the nut and bolt 34 and 36 are tightened. This permits adjustment of the penetration of the end portion of the thin-walled tube inside the coupling sleeve, while in assembled relation.

Furthermore, since the coupling sleeve can be loosened and slid back on the thin-walled tube, both the coupling sleeve and clamp, still in assembled relation, could be moved back along the tube if the protuberances were resilient enough, or if they were mounted by the structure shown in FIG. 8, for any necessary replacement of the seals 20 or to permit maintenance work.

To this point, the principles of this invention have been applied to the problem of joining two thin-walled tubes to a coupling sleeve by means of a clamping ring described above. However, as shown in FIG. 9, the principles of this invention could be practiced by modifying the coupling sleeve or tube 64, so one end 66 is attached to an opening in the bulkhead 10 as described above. The opposite end of the coupling tube has an annular rib 70 integrally formed or attached to it. The thin-walled tube 72 extends inside the coupling tube 64 and is held there by the clamping ring 28 as described above. It is also noted that the coupling tube 64 tapers down from end portion 66 to the smaller diameter end portions 68, which is substantially equal to the diameter of the thin-walled tube 72, so that the thin-walled tube 72 can pivot inside the coupling tube 64 in a slip joint connection.

Having shown and described the invention, what we claim as new is:

1. A connector of the class described comprising a coupling member, said coupling member having an annular radially projecting rib on at least one end, said rib defining an inverted seal-ring-receiving channel, a seal ring in said channel, a tubular member, one end of said tubular member extending in said coupling member with the surface of the end of the tubular member in sealing and pivoting engagement with said seal ring, whereby said tubular member can flex slightly with respect to said coupling member to accommodate vibration without leaking gas, an annular clamp ring releasably embracing said tubular member, said clamp ring having a plurality of longitudinally extending claws, said claws channel shaped in cross section and extending over said radially projecting ribs to prevent separation between said coupling member and said tubular member when tension exists between the coupling member and the tubular member, and formations integrally formed on said tubular member to position said clamping rings a predetermined distance from the end of said tubular member so that in assembled relation a predetermined length of the end of the tubular member extends inside the coupling member to prevent leakage of gas or separation between the coupling member and the tubular member, said formations constructed to permit said coupling member to slip over them so that the coupling member can move over the formations on the tubular member a distance sufficient to permit access to the interior of the coupling member.

2. The connector described in claim 1 wherein said means for positioning said clamping ring on said tubular member comprises spaced annular radially projecting ribs on said tubular member, the space between said ribs substantially equal to the width of the clamp ring whereby in assembled relation the clamp ring embraces said tubular member with its edge portions bearing against said ribs whereby said clamping ring cannot be easily moved longitudinally over the surface of said tubular member, said annular ribs treated so they are flexible enough both to hold the clamping ring in position on said tubular member and to permit the said coupling member to be forced over the ribs so the coupling member and tubular member can move relative to each other for maintenance purposes.

3. The connector described in claim 1 wherein said means for positioning said clamping ring on said tubular member comprises a plurality of protuberances formed on the surface of said tubular member in angularly spaced relationship, said protuberances positioned so in assembled relation when the clamp ring embraces said tubular member and an edge of the clamp ring bears against said protuberances, the end portion of the tubular member extends a sufficient distance inside said coupling member to prevent leakage of gasses or separation between the coupling member and the tubular member, said protuberances treated so they are flexible enough to permit coupling member to be forced over them and over the surface of the tubular member for maintenance purposes.

4. The connector described in claim 1 wherein said means for positioning said clamping member on said tubular member comprises an annular recess positioned on said tubular member at a predetermined distance from the end of said tubular member, the width of said annular recess substantially equal to the width of said annular clamp ring so that in assembled relation the clamp ring fits in said recess when it embraces said tubular member and the opposed edges of said clamp ring bear against the sides of the recess to prevent said clamp ring from moving longitudinally on said tubular member, whereby the end portion of the tubular member extends inside the coupling member a sufficient distance to prevent leakage of gasses or separation between the coupling member and the tubular member.

5. A connector of the class described comprising a coupling member, said coupling member having an annular radially projecting rib on at least one end, said rib defining an inverted seal-ring-receiving channel, a seal ring in said channel, a tubular member, one end of said tubular member extending in said coupling member with the surface of the end of the tubular member in sealing and pivoting engagement with said seal ring, whereby said tubular member can flex slightly with respect to said coupling member to accommodate vibration without leaking gas, an annular clamp ring releasably embracing said tubular member, said clamp ring having a plurality of longitudinally extending claws, said claws channel shaped in cross section and extending over said radially projecting ribs to prevent separation between said coupling member and said tubular member when tension exists between the coupling member and the tubular member, and means on said tubular member to position said clamping ring a predetermined distance from the end of said tubular member so that in assembled relation a predetermined length of the tubular member extends inside the coupling member to prevent leakage of gas or separation between the coupling member and the tubular member, said means for positioning said clamping member on said tubular member comprising holes formed on at least one annular circle around the periphery of the tubular member, a resilient support attached to the end portion of said tubular member, protuberances mounted on said support, said support positioned so said protuberances extend through said holes in sealing engagement therewith, so in assembled relation when the clamp ring embraces the tubular member with at least one edge of the clamp ring bearing against said resiliently mounted protuberances the clamp ring is at least prevented from moving longitudinally on the surface of the tubular member beyond a predetermined distance from the end of the tubular member, while the end portion of the tubular member extends a sufficient distance inside said coupling member to prevent leakage of gasses or separation between the coupling member and the tubular member.

6. A connector of the class described comprising a coupling member, said coupling member tapered toward at least one end, an annular radially projecting rib on at least one end, said rib defining an inverted seal-ring-receiving channel, a seal ring in said channel, the thickness of said seal ring greater than the depth of said channel, a tubular member, one end of said tubular member extending in said coupling member with the surface of said end of the tubular member in sealing and pivoting engagement with said seal ring whereby said tubular member can flex slightly with respect to said coupling member to accommodate vibration without leaking gas, an annular clamp ring releasably embracing said tubular member, said clamp ring having a plurality of longitudinally extending claws, said claws channel shaped in cross section and extending over said radially projecting rib to prevent separation between said coupling member and said tubular member when tension exists between the coupling member and tubular member, and positioning means integrally formed on said tubular member to position said clamping ring a predetermined distance from the end of said tubular member so that in assembled relation a predetermined length of the tubular member extends inside said coupling member, said integrally formed positioning means formed to permit said coupling member to move over said positioning means so that access may be had to the interior of the coupling member for maintenance purposes.

7. The connector described in claim 6 wherein said positioning means comprises an annular recess formed on the surface of said tubular member at a predetermined distance from the end of said tubular member, the width of said recess substantially equal to the width of said annular clamp ring so that in assembled relation the clamp ring fits in said recess while the clamp ring embraces said tubular member and the opposed edges of said clamp ring bear against the sides of said recess whereby the clamp ring is prevented from moving longitudinally on said tubular member, and the free end of the tubular member extends inside said coupling member a distance sufficient to prevent leakage of gasses and so the coupling member can be slid over the recess back on said tubular member when maintenance work requires access to the interior of the coupling member.

8. A connector of the class described comprising a coupling member, said coupling member tapered toward at least one end, an annular radially projecting rib on at least one end, said rib defining an inverted seal-ring-receiving channel, a seal ring in said channel, the thickness of said seal ring greater than the depth of said channel, a tubular member, one end of said tubular member extending in said coupling member with the surface of said end of the tubular member in sealing and pivoting engagement with said seal ring whereby said tubular member can flex slightly with respect to said coupling member to accommodate vibration without leaking gas, an annular clamp ring releasably embracing said tubular member, said clamp ring having a plurality of longitudinally extending claws, said claws channel shaped in cross section and extending over said radially projecting rib to prevent separation between said coupling member and said tubular member when tension exists between the coupling member and tubular member, and means on said tubular member to position said clamping ring a predetermined distance from the end of said tubular member so that in assembled relation a predetermined length of the tubular member extends inside said coupling member, said positioning means formed to permit said coupling member to slide over the positioning means so that access may be had to the interior of the coupling member for maintenance purposes, said positioning means comprises holes formed along at least one annular circle around the periphery of the tubular member, a resilient support attached to the end portion of said tubular member, protuberances mounted on said support, said support positioned so said protuberances extend through said holes so in assembled relation when the clamp ring embraces said tubular member and an edge of the clamp ring bears against said protuberances the tubular member extends a sufficient distance inside the coupling member to prevent leakage of gas or separation of the coupling member and the tubular member and so the coupling member can be slid over the resiliently mounted protuberances back on said tubular member when maintenance work requires access to the interior of the coupling member or tubular member.

9. A connector of the class described comprising a coupling member, said coupling member having an annular radially projecting rib on each end, each rib defining an inverted seal-receiving channel, a seal ring in said channel, a tubular member for each end of said coupling member, each tubular member connected at one end to fluid lines with the opposite end extending in each end of said coupling member with the surface of the said opposite end of each tubular member in sealing and pivoting engagement with the seal rings in the ends of the coupling member, whereby said tubular members can flex slightly with respect to said coupling member to accommodate vibrations without leaking fluid, an annular clamp ring releasably embracing each tubular member, said clamp rings having at least one longitudinally extending claw, said claw extending over said radially projecting ribs at each end of said coupling member to prevent separation between said coupling member and said tubular members when tension exists between said coupling member and the tubular members, and formations integrally formed on each tubular member to position said clamping rings a predetermined distance from the end of said tubular member so that in assembled relation a predetermined length of the tubular members extends inside each end of the coupling member to prevent leakage of fluid or separation between the coupling member and the tubular member, said formations constructed to permit said coupling member to be moved over them so that the coupling member can move over the surface of either of the tubular members a distance sufficient to expose an end of the coupling member to permit access to the interior of the coupling member for maintenance purposes without disconnecting the tubular members from any fluid lines.

* * * * *